(12) United States Patent
Obermann

(10) Patent No.: US 6,838,634 B2
(45) Date of Patent: Jan. 4, 2005

(54) DEVICE FOR WELDING METAL ELEMENTS TO STRUCTURAL PARTS

(75) Inventor: Wolgang Obermann, Grünberg (DE)

(73) Assignee: Newfrey LLC, Newark, DE (US)

( * ) Notice: Subject to any disclaimer, the term of this patent is extended or adjusted under 35 U.S.C. 154(b) by 10 days.

(21) Appl. No.: 10/414,465

(22) Filed: Apr. 15, 2003

(65) Prior Publication Data

US 2003/0217992 A1 Nov. 27, 2003

(30) Foreign Application Priority Data

May 3, 2002 (DE) .......................................... 102 20 560

(51) Int. Cl.$^7$ ................................................ B23K 9/20
(52) U.S. Cl. ..................................... 219/98; 219/130.01
(58) Field of Search ......................... 219/98, 99, 130.01

(56) References Cited

U.S. PATENT DOCUMENTS

| | | | | |
|---|---|---|---|---|
| 2,863,984 A | * | 12/1958 | Schaefer et al. ............... | 219/75 |
| 3,546,420 A | | 12/1970 | Ettinger et al. | |
| 3,582,602 A | | 6/1971 | Ettinger et al. | |
| 3,723,700 A | * | 3/1973 | Ettinger ........................ | 219/98 |
| 3,997,754 A | * | 12/1976 | Moliner et al. ................ | 219/99 |
| 4,027,136 A | * | 5/1977 | Taylor .......................... | 219/98 |
| 4,267,425 A | | 5/1981 | Kondo | |
| 4,417,120 A | | 11/1983 | Lumbra et al. | |
| 4,549,068 A | | 10/1985 | Kensrue | |
| 4,797,529 A | | 1/1989 | Schmitt et al. | |
| 4,988,842 A | | 1/1991 | Van Allen | |
| 5,317,123 A | | 5/1994 | Ito | |
| 5,317,124 A | | 5/1994 | Lesser et al. | |
| 5,384,445 A | | 1/1995 | Nakagami | |
| 5,389,762 A | * | 2/1995 | Schneegans .................. | 219/99 |
| 5,688,414 A | * | 11/1997 | Kondo ......................... | 219/98 |
| 5,753,883 A | * | 5/1998 | Remerowski ................ | 219/98 |
| 5,977,506 A | | 11/1999 | von Daniken | |
| 6,239,401 B1 | | 5/2001 | McCardle et al. | |
| 2003/0052093 A1 | | 3/2003 | Stepetic et al. | |

* cited by examiner

Primary Examiner—Clifford C. Shaw
(74) Attorney, Agent, or Firm—Harness, Dickey & Pierce, P.L.C.

(57) ABSTRACT

Proposed is a device for welding metal elements, in particular studs, to structural parts, having a welding head that has a collet chuck for the accommodation of an element, having a feed unit for the feed of elements into the chuck, and having a power supply means for the supply of electric energy for a welding procedure. The chuck has at least two segments electrically insulated from one another. It can be detected via an applied test voltage whether a metal element to be welded is located in the chuck.

33 Claims, 1 Drawing Sheet

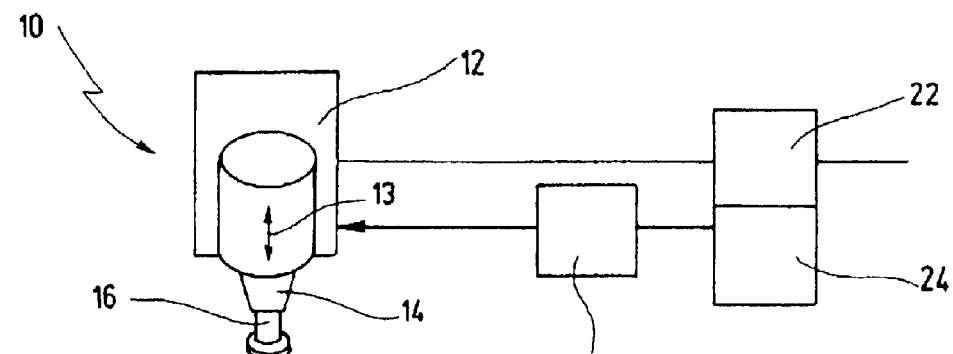
Fig.1
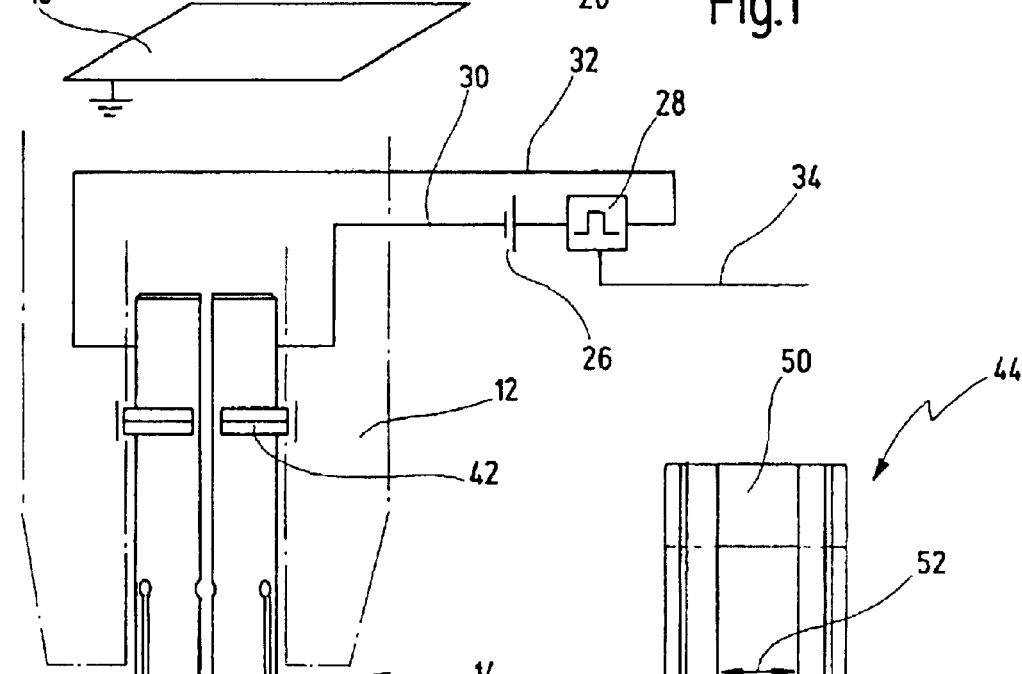
Fig.2
Fig.3
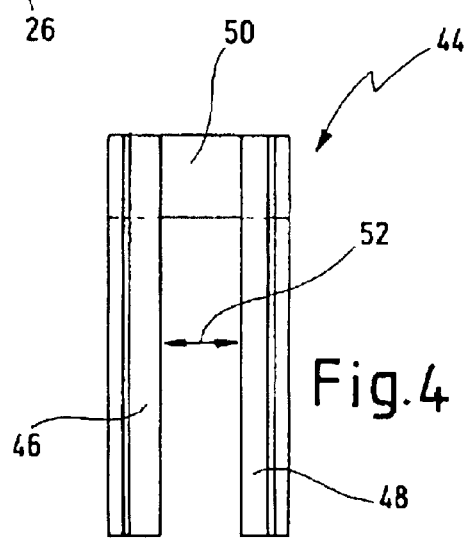
Fig.4
Fig.5

DEVICE FOR WELDING METAL ELEMENTS TO STRUCTURAL PARTS

BACKGROUND AND SUMMARY OF THE INVENTION

The invention relates to a device for welding metal elements, in particular studs, to structural parts, having a welding head that has a collet chuck for the accommodation of an element, having a feed unit for the feed of elements into the chuck, and having a power supply means for the supply of electric energy for a welding procedure.

A welding device of this type is disclosed for example in EP 0,784,526 B1. Here the welding process used is so-called short-time arc welding, which is also generally known by the term "stud welding." In this process, an element accommodated in a collet chuck in connection with a welding procedure is first raised with respect to the structural part, a welding arc is formed between the element and the structural part and the element is then lowered again.

The technology of stud welding is used especially, but not exclusively, in the automotive industry. This technology allows studs, with or without thread, nuts, eyes and other elements to be welded to metal sheets of car bodies. The elements then as a rule act as holding anchors for fastening interior fittings to the body of the vehicle.

In the stud welding mentioned above, an element first is inserted into a collet chuck of a welding head. This may be effected by an automatic feed means, for example by means of compressed air. After suitable positioning of the element with regard to the structural part, as a rule by means of a robot arm, the welding procedure is begun.

It goes without saying that with such welding devices a multiplicity of welding procedures must be carried out successively, as a rule fully automated. Here, the elements to be welded may for example be inserted directly into the chuck by means of compressed air. Such automatic feed generally can be reliably achieved. At the same time, it goes without saying that a welding procedure should be begun only when an element to be welded is actually located in the chuck. In continuous operation, however, failures in automatic feed of elements into the chuck may also occur. In such cases, failure in the feed of elements to be welded should be detected as early as possible and, for safety reasons, no attempt should be made to commence a welding procedure.

The object of the invention therefore is to procure an improved device for the welding of metal elements to structural parts, by which a failure in the automatic feed of metal elements into the collet chuck can be detected as reliably as possible. This object is accomplished in a device of the type mentioned at the beginning in that the collet chuck has at least two segments electrically isolated from one another. In this way, the object of the invention is fully accomplished. Namely, here examination, directly on the chuck, of whether or not an element to be welded is located in the chuck is made possible in extremely simple and low-cost fashion. For this purpose, only the electrical connection that is produced between the segments isolated from one another upon receipt of a metal element need be evaluated.

In an advantageous refinement of the invention, the segments electrically isolated from one another are coupled with a sensor means for the detection of an electrical contact being made between the electrically isolated segments. For this purpose, according to another embodiment of the invention, the segments may be connected with a test voltage and a flow of current between the segments may be evaluated by the sensor means. Here the sensor means may generate a signal, preferably digital, which indicates whether an element is carried in the chuck.

According to another embodiment of the invention, a control means, with which the sensor means is coupled, is provided for control of the welding procedure. These measures make it possible, in especially simple, low-cost and reliable fashion, to determine whether or not an element to be welded is located in the chuck. By evaluation of the flow of current and advantageously its conversion into a digital signal, the control means, which as a rule is a microprocessor control, therefore can then emit a digital signal that indicates whether an element to be welded is located in the chuck or not. The control unit may be programmed in such a way that a welding procedure can be started only when it is detected that an element to be welded is held in the chuck. Otherwise, an appropriate error signal optionally may be emitted.

According to a first variant of the invention, the collet chuck has segments designed flexible. Here the chuck may have two segments, which, as customary in conventional one-piece collet chucks, are segmented into unbroken sub-segments by longitudinal slits.

According to a second variant of the invention, the collet chuck has guide sections on its segments for the radial feed of elements. Such a design is advantageous especially when the elements to be welded are not to be fed into the chuck axially, but rather, laterally. Here, for the feed of an element to be welded, the two segments are moved apart and after feed of the element to be welded are moved together again until the element is held between the two segments of the chuck. The guide sections may alternatively be designed springy, in order to facilitate radial feed. Here, electrical evaluation of the test voltage via the sensor means may simultaneously be utilized for position control for correct closing motion of the two segments of the chuck, which represents an additional advantage.

According to an additional embodiment of the invention, the segments, isolated from one another, may be held together by an annular element. This is advisable especially in the embodiment as a flexible collet chuck, for which for example an open ring of synthetic material may be used. It goes without saying that the features of the invention mentioned above and those yet to be explained below may be used not only in the combination indicated in each instance, but alternatively in other combinations or standing alone, without departing from the scope of the invention. Additional features and advantages of the invention appear in the following description of preferred examples with reference to the drawing, wherein:

BRIEF DESCRIPTION OF THE DRAWINGS

FIG. 1 shows a device according to the invention in greatly simplified schematic representation;

FIG. 2, the front end of the welding head of FIG. 1 with collet chuck accommodated therein, in enlarged side view;

FIG. 3, a view of the collet chuck of FIG. 2 from the front;

FIG. 4, a longitudinal view of an embodiment of a collet chuck, modified with respect to FIG. 2; and FIG. 5, a front view of the two segments of the collet chuck of FIG. 4.

DETAILED DESCRIPTION OF THE PREFERRED EMBODIMENT

In FIG. 1, a device for welding metal elements 16 to structural parts 18 is illustrated extremely schematically and labeled as a whole with the numeral 10. In the case illustrated, the metal elements may for example be studs, which are to be welded onto a metal sheet of a car body. Here so-called short-time arc welding, which by and large is well known, being disclosed for example in EP 0,784,526 B1, is used as the welding process.

The device 10 has a welding head 12, which in use in the automotive industry is as a rule accommodated on a robot arm. In the welding head 12 a collet chuck 14 is provided for the accommodation of an element 16 to be welded. Elements to be welded are fed to the chuck 14 from an element feed means 20 by for example compressed air. The power required for short-time arc welding is provided by a power supply means 22, which is controlled via a control means 24, which alternatively controls the other functions of the welding device. It is understood that the control means 24 may be coupled, via suitable interfaces, with a control of the robot arm in which the welding device 10 is accommodated, and preferably is coupled to the overriding process control via for example an industrial bus. During the welding process, the element 16 to be welded is first raised with respect to the grounded structural part 18 and a welding arc is formed between the element 16 and the structural part 18. In the course of the welding procedure, the element 16 is then lowered again in basically well known fashion, as indicated by the double arrow 13.

According to the invention, a special design of the collet chuck 14 allows checking of whether an element 16 to be welded has been fed correctly into the chuck 14. This is explained in detail below, with reference to FIG. 2. In FIG. 2, a collet chuck 14 is shown in the longitudinal view, where the associated welding head 12, from which the chuck 14 projects outward, is indicated only schematically by a dot-dash line.

The collet chuck 14 is divided by two continuous longitudinal slits 40b, 40e (cf. FIG. 3) along its center axis into two segments 36, 38 designed symmetrical to one another, so that two halves, electrically isolated from one another, are formed. At its outer end the chuck 14 is converted via a section running tapered into a cylindrical section, which has a smaller diameter than the rest of the cylindrical region of the chuck. The collet chuck 14 in addition has longitudinal slits 40a, c, d, f, which extend out from the outer end 39 of the chuck 14 in axial direction over about two-thirds of the total length of the chuck. In this way, the two segments 36, 38 of the chuck 14 are segmented via the longitudinal slits 40a, c, d, f into unbroken zones or subsegments 36a, b, c and 38a, b, c. In this way, the collet chuck is designed flexible.

The two segments 36, 38 of the chuck 14 may be held together by a surrounding ring 42, which consists of an insulating material, for example of synthetic material. The ring 42 is not completely closed, but is open at one point, in order to permit some radial movement of the two segments 36, 38 with respect to one another.

The two segments 36, 38 are connected via lines 30, 32 with a test voltage source 26. Now, if an electrically conductive metal element 16 is held in the outer end 39 of the chuck 14, the electric circuit is thereby closed. The test current is detected by a sensor means 28 located in the electric circuit and may be transmitted via for instance a line 34 as a digital signal ("stud-in-holder signal") to the control means 24. In this way, errors in the feed of elements 16 from the element feed means 20 can be detected in simple fashion. The control means 24 only initiates a welding procedure when it is notified by the sensor means 28 that an element to be welded has been fed correctly.

In FIG. 4, an alternative embodiment of a collet chuck according to the invention is shown in the longitudinal view and labeled as a whole with the numeral 44. The collet chuck 44 again consists of two segments 46, 48 electrically isolated from one another. Unlike the embodiment previously explained with reference to FIGS. 2 and 3, however, here this is not a flexible chuck 44, but a chuck with two substantially rigid segments 46, 48, which are accommodated movable radially with respect to one another in the welding head 12, as is indicated by the numeral 52. At the inner end of the chuck 44 is accommodated a cylindrical part 50 of synthetic material, which serves as a detent when the two segments 46, 48 are brought together.

For the feed of an element 16 into the chuck 44, therefore, the two segments 46, 48 are moved outward in a fashion not described in detail and then an element 16 preferably is fed from the side. In principle, axial feed would also alternatively be possible. In the present case, however, the two segments 46, 48 have guide sections 47, 49, which widen outward from the respective end of a circular segmental section, in order to support centering in the radial feed of elements 16. If a metal element is located between the two segments 46, 48 of the chuck 44, a test current again flows through the associated test arrangement, which may be designed according to FIG. 2. In a chuck 44 with two segments 46, 48 movable radially with respect to one another, an additional advantage of the embodiment according to the invention consists in that when it is detected via the test current that an element 16 is correctly held in the chuck 44, the chuck 44 simultaneously is correctly closed, so that any possible error in case of incorrect closing of the chuck 44 is likewise detected.

The invention claimed is:

1. A device for welding metal elements, the device comprising:
   a welding head including a collet chuck adapted to receive the elements;
   a feed unit operably feeding the elements into the collet chuck; and
   a power supply operably supplying electricity to at least part of the collet chuck;
   the collet chuck having at least two segments spatially separable from each other for an entire length of the collet chuck, and electrically isolated from one another at least prior to insertion of the elements; and
   a first power supply line operably connecting a first one of the segments to the power supply and a second power supply line operably connecting a second one of the segments to the power supply.

2. The device according to claim 1, further comprising a sensor operably detecting an electrical contact being made between the electrically isolated segments.

3. The device according to claim 2 further comprising a test voltage operably sent to at least one of the segments and the sensor operably evaluating a flow of current between the segments.

4. The device according to claim 1 further comprising a sensor operably generating a signal that indicates whether at least one of the elements is in the collet chuck.

5. The device according to claim 4 wherein the signal is a digital signal, and the sensor is connected to at least two of the segments.

6. The device according to claim 1 wherein the collet chuck is flexible.

7. The device according to claim 1 wherein the collet chuck has two of the segments which are each segmented into unbroken subsegments by longitudinal slits.

8. The device according to claim 1 wherein the collet chuck has at least one guide section outwardly extending from a lateral side of each of the segments to assist in radial feeding of elements into the collet chuck.

9. The device according to claim 1 further comprising an annular element assisting in holding together the segments.

10. The device according to claim 1 wherein the welding head and power supply operably cause sequential, arc welding of the elements which are studs.

11. The device according to claim 1 wherein the elements are threaded and longitudinally elongated.

12. An arc welding system, comprising:
a collet chuck having at least two longitudinally elongated segments which are electrically isolated from one another and completely separated by longitudinally elongated slots; and
a sensor operably detecting an electrical contact being made between the segments.

13. The system according to claim 12, further comprising a test voltage operably sent to at least one of the segments and the sensor operably evaluating a flow of current between the segments.

14. The system according to claim 12 further comprising:
a weldable element receivable in the collet chuck; and
the sensor operably generating a signal that indicates whether the element is in the collet chuck.

15. The system according to claim 14 wherein the signal is a digital signal, and the sensor is connected to at least two of the segments.

16. The system according to claim 12 further comprising a set of rigid metal elements sequentially feeding into the collet chuck for being weldably melted at least in part.

17. The system according to claim 16 wherein the elements are weld studs.

18. The system according to claim 16 wherein the elements are threaded.

19. The system according to claim 12 wherein the collet chuck is flexible.

20. The system according to claim 12 wherein the collet chuck has two of the segments which are each segmented into unbroken subsegments by longitudinal slits.

21. The system according to claim 12 wherein the collet chuck has at least one guide section outwardly extending from a lateral side of each of the segments to assist in radial feeding of weldable elements into the collet chuck.

22. The system according to claim 12 further comprising an annular element assisting in holding together the segments.

23. The system according to claim 12 wherein a distal end of the collet chuck adjacent a workpiece has a smaller diameter than an opposite proximal end of the collet chuck.

24. A welding collet chuck, comprising:
at least two electrically isolated segments flexibly spaced from each other; and
a sensor operably detecting an electrical contact being made between the electrically isolated segments.

25. The chuck according to claim 24 further comprising a distal end adjacent a workpiece has a smaller diameter than an opposite proximal end.

26. The chuck according to claim 25 further comprising a tapered section located between the ends.

27. The chuck according to claim 24 further comprising a set of rigid metal elements sequentially feeding into the collet chuck for being weldably melted at least in part.

28. The chuck according to claim 27 wherein the elements are discrete, weld studs which connect electricity between the segments and assist in creating a welding arc.

29. The chuck according to claim 24 further comprising a threaded weld stud contacting against the segments.

30. The chuck according to claim 24 further comprising a test voltage operably sent to at least one of the segments wherein the sensor operably evaluates a flow of current between the segments.

31. The chuck according to claim 24 wherein there are only two of the segments which are each segmented into unbroken subsegments by longitudinal slits.

32. The chuck according to claim 24 wherein the collet chuck has at least one guide section outwardly extending from a lateral side of each of the segments to assist in radial feeding of weldable elements within the segments.

33. A device for welding metal elements, the device comprising:
a welding head including a collet chuck adapted to receive the elements;
a feed unit operably feeding the elements into the collet chuck; and
a power supply operably supplying electricity to at least part of the collet chuck;
the collet chuck having at least two segments electrically isolated from one another at least prior to insertion of the elements; and
a sensor operably detecting an electrical contact being made between the electrically isolated segments.

* * * * *